(12) United States Patent
Schmittner et al.

(10) Patent No.: US 9,903,772 B2
(45) Date of Patent: Feb. 27, 2018

(54) HERMETIC WEIGHING CELL HAVING OVERLOAD PROTECTION

(71) Applicant: Hottinger Baldwin Messtechnik GmbH, Darmstadt (DE)

(72) Inventors: Arno Schmittner, Koenigsbronn (DE); Ralf Scherer, Mainz (DE)

(73) Assignee: Hottinger Baldwin Messtechnik GmbH, Darmstadt (DE)

( * ) Notice: Subject to any disclaimer, the term of this patent is extended or adjusted under 35 U.S.C. 154(b) by 0 days.

(21) Appl. No.: 14/867,211

(22) Filed: Sep. 28, 2015

(65) Prior Publication Data
US 2016/0084720 A1  Mar. 24, 2016

Related U.S. Application Data

(62) Division of application No. 13/639,587, filed as application No. PCT/EP2011/001701 on Apr. 6, 2011, now Pat. No. 9,164,004.

(30) Foreign Application Priority Data

Apr. 7, 2010  (DE) .................. 10 2010 014 152

(51) Int. Cl.
*G01L 1/26* (2006.01)
*G01G 3/12* (2006.01)
(Continued)

(52) U.S. Cl.
CPC .............. *G01L 1/26* (2013.01); *G01G 3/12* (2013.01); *G01G 21/30* (2013.01); *G01G 23/005* (2013.01)

(58) Field of Classification Search
CPC ........ G01L 1/26; G01G 21/30; G01G 23/005; G01G 3/12
See application file for complete search history.

(56) References Cited

U.S. PATENT DOCUMENTS 3,592,054 A  7/1971  Stewart et al.
3,788,133 A  1/1974  Paelian et al.
(Continued)

FOREIGN PATENT DOCUMENTS

CN  2253469 Y  4/1997
CN  201107105 Y  8/2008
(Continued)

OTHER PUBLICATIONS

International Search Report of the International Searching Authority for International Application PCT/EP2011/001701, dated Aug. 1, 2011, 2 pages, European Patent Office, HV Rijswijk, Netherlands.
(Continued)

*Primary Examiner* — Lisa Caputo
*Assistant Examiner* — Philip Cotey
(74) *Attorney, Agent, or Firm* — W. F. Fasse

(57) ABSTRACT

A load cell has a longitudinal body including a bending beam axially between a force input element and a force output element, strain gages applied on strainable measuring parts of the bending beam, a hermetically sealed enclosure outside around the strain gages and the strainable measuring parts, and an overload protection arrangement including an overload beam in a recess in the bending beam, a receiving hole partially in the overload beam, and a fitting pin received in the receiving hole so that a defined gap is formed between the fitting pin and an adjacent stop surface in the recess of the bending beam. In further embodiments, the enclosure includes a stiff pipe sleeve and ring elements with flexible membranes connecting the sleeve to the longitudinal body, and a mounting end face of the longitudinal body has centering pins in holes and an O-ring in a groove.

21 Claims, 2 Drawing Sheets

(51) Int. Cl.
*G01G 21/30* (2006.01)
*G01G 23/00* (2006.01)

(56) References Cited

U.S. PATENT DOCUMENTS

| | | | |
|---|---|---|---|
| 3,917,981 A | 11/1975 | Keen | |
| 4,020,686 A | 5/1977 | Brendel | |
| 4,112,751 A * | 9/1978 | Grunbaum | F16C 19/522 73/862.382 |
| 4,196,784 A | 4/1980 | Suzuki et al. | |
| 4,338,825 A * | 7/1982 | Amlani | G01G 3/1412 177/156 |
| 4,364,280 A * | 12/1982 | Kutsay | G01L 1/26 73/862.382 |
| 4,453,422 A | 6/1984 | Yorgiadis | |
| 4,488,611 A * | 12/1984 | Jacobson | G01G 3/1412 177/211 |
| 4,558,756 A * | 12/1985 | Seed | G01G 3/1412 177/211 |
| 4,596,155 A | 6/1986 | Kistler | |
| 4,619,147 A | 10/1986 | Yoshimura et al. | |
| 4,677,862 A * | 7/1987 | Raskin | G01L 1/2225 338/5 |
| 4,733,571 A | 3/1988 | Ormond | |
| 4,804,053 A | 2/1989 | Nordstrom | |
| 4,815,547 A | 3/1989 | Dillon et al. | |
| 4,932,253 A | 6/1990 | McCoy | |
| 4,957,177 A | 9/1990 | Hamilton et al. | |
| 4,993,506 A * | 2/1991 | Angel | G01G 19/44 177/211 |
| 5,065,129 A * | 11/1991 | Hellwig | G01L 9/0064 29/621.1 |
| 5,509,317 A | 4/1996 | Gross | |
| 5,566,575 A | 10/1996 | Will et al. | |
| 5,866,854 A | 2/1999 | Emery | |
| 5,895,894 A | 4/1999 | Zumbach | |
| 6,555,767 B1 | 4/2003 | Lockery et al. | |
| 6,694,829 B2 | 2/2004 | Chimura et al. | |
| 6,789,435 B2 | 9/2004 | Hopkins | |
| 7,176,391 B2 | 2/2007 | Metz | |
| 7,432,457 B2 | 10/2008 | Vayhinger et al. | |
| 8,153,913 B2 | 4/2012 | Haefeli et al. | |
| 2002/0069708 A1 | 6/2002 | McKenna | |
| 2004/0060372 A1 | 4/2004 | Hopkins | |
| 2004/0163481 A1* | 8/2004 | Lockery | G01G 3/1414 73/862.628 |
| 2007/0007049 A1 | 1/2007 | Kuchel et al. | |
| 2007/0089581 A1 | 4/2007 | Sandberg et al. | |
| 2007/0277621 A1 | 12/2007 | Schlachter et al. | |
| 2012/0061151 A1 | 3/2012 | Schmittner et al. | |
| 2013/0074610 A1* | 3/2013 | Schmittner | G01G 3/12 73/862.627 |

FOREIGN PATENT DOCUMENTS

| | | |
|---|---|---|
| CN | 201210079 Y | 3/2009 |
| CN | 101581600 A | 11/2009 |
| DE | 1 573 896 | 1/1971 |
| DE | 2 117 424 | 10/1972 |
| DE | 28 18 140 | 11/1979 |
| DE | 37 15 572 | 11/1988 |
| DE | 38 24 636 | 1/1990 |
| DE | 102004027619 | 1/2006 |
| DE | 102004047508 | 4/2006 |
| DE | 102008064169 | 6/2010 |
| EP | 0 816 812 | 1/1998 |
| EP | 1 698 871 | 9/2006 |
| EP | 2 120 023 | 11/2009 |
| GB | 1 106 877 | 3/1968 |
| GB | 2 020 440 | 11/1979 |
| GB | 2 150 307 | 6/1985 |
| JP | 59-031026 U | 2/1984 |
| JP | 01-250028 A | 10/1989 |
| JP | 10-339676 A | 12/1998 |
| JP | 2001-099698 A | 4/2001 |
| JP | 2001-343294 A | 12/2001 |
| JP | 2003-021554 A | 1/2003 |
| JP | 2006-349659 A | 12/2006 |

OTHER PUBLICATIONS

PCT International Preliminary Report on Patentability including English Translation of PCT Written Opinion of the International Searching Authority for International Application PCT/EP2011/001701, dated Oct. 9, 2012, 10 pages, International Bureau of WIPO, Geneva, Switzerland.
Office Action in U.S. Appl. No. 13/141,561, dated Sep. 13, 2013, 11 pages.
German Office Action in German Patent Application No. 10 2008 064 169.3-53, dated Sep. 10, 2009, 3 pages, with partial English translation, 2 pages.
German Office Action in German Application No. 10 2010 014 152.6-53, dated Jan. 12, 2011, 4 pages, Muenchen, Germany, with partial English translation, 4 pages.
Chinese Office Action in Chinese Patent Application No. 200980112921.4, dated Oct. 29, 2012, 6 pages, with partial English translation, 4 pages.
Partial English translation of Japanese Office Action in Japanese Patent Application No. 2011-541196, dated Nov. 12, 2013, 5 pages.
Office Action in U.S. Appl. No. 13/141,561, dated Jun. 24, 2014, 8 pages.
Office Action in U.S. Appl. No. 13/141,561, dated Mar. 3, 2015, 9 pages.
Chinese Search Report (2 pages) from Chinese Office Action dated Jun. 4, 2014 in Chinese Patent Application No. 201010510746.9, with English translation (2 pages).
English translation (2 pages) of Japanese Office Action dated Sep. 17, 2014 in Japanese Patent Application No. 2011-541196.
English translation (human-prepared) of Japanese Patent Application Publication 2001-099698A, published Apr. 13, 2001.

* cited by examiner

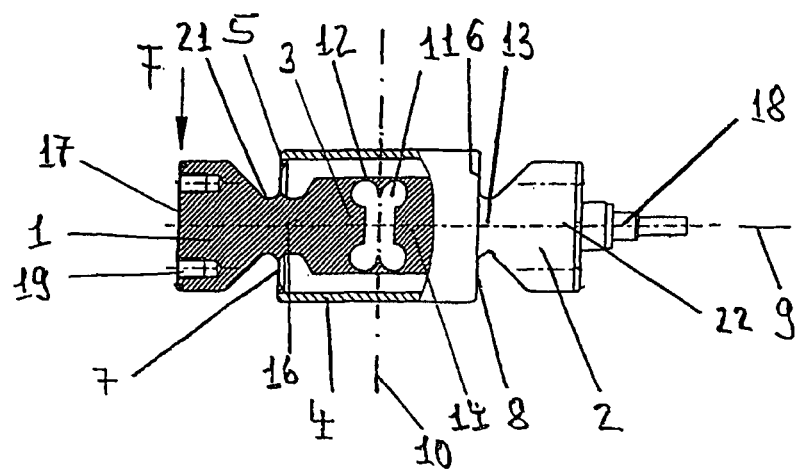
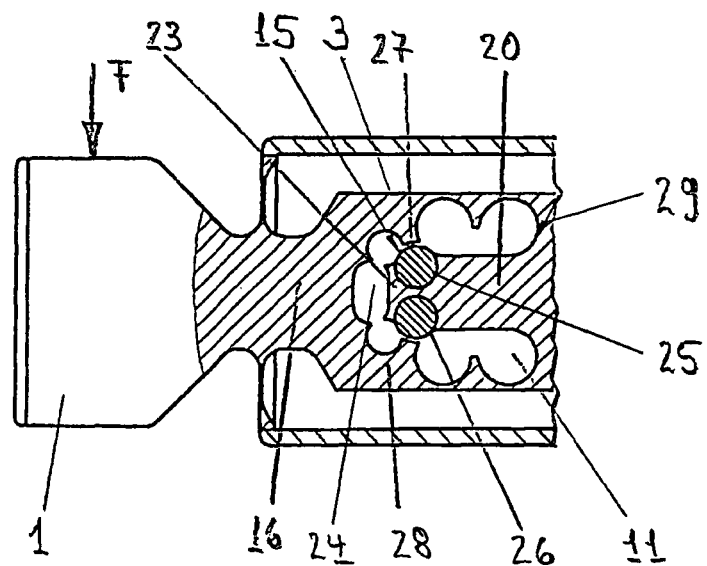

ded with largely flat exterior surfaces, whereby however foodstuff or liquid residues can deposit especially on the horizontally extending cover surface, and these residues in connection with moisture tend to cause an increase or multiplication of bacteria or viruses. Moreover, dirt and foodstuff components could also adhere in the pot-shaped depressions, which may only be cleaned with difficulty, and in which fungi and bacteria could form. Therefore, even such a hermetically sealed load cell is often not usable in aseptic areas or fields according to the applicable hygiene regulations.

HERMETIC WEIGHING CELL HAVING OVERLOAD PROTECTION

CROSS-REFERENCE TO RELATED APPLICATIONS

This application is a Divisional under 35 USC 120 and 121 of U.S. application Ser. No. 13/639,587, having a US filing date of Dec. 14, 2012, which is a US National Stage Application under 35 USC 371 of PCT International Application PCT/EP2011/001701 filed on Apr. 6, 2011, and which issued as U.S. Pat. No. 9,154,004 on Oct. 20, 2015. The entire disclosure of the above prior US Application is incorporated herein by reference.

This application is also related to U.S. application Ser. No. 13/141,561, which is a US National Stage Application under 35 USC 371 of PCT International Application PCT/EP2009/009004 filed on Dec. 16, 2009, and which issued as U.S. Pat. No. 9,255,832 on Feb. 9, 2016.

FIELD OF THE INVENTION

The invention relates to a load cell of the bending beam type, preferably for an aseptic platform scale, and having a sealed enclosure as well as a sealed mounting connection, and especially having an overload protection arrangement.

BACKGROUND INFORMATION

Load cells are special cases of the force transducers or pick ups, and are provided for the construction of weighing devices. Such weighing devices are often also used in the supply of foodstuffs, so that they often must satisfy special hygiene regulations. Therefore, it is also necessary for the load cells used in those applications, that these are constructed so that no dirt and no foodstuff residues can permanently collect on their surfaces, or at least must be easily removable. Furthermore, there are often horizontal surfaces, gaps and depressions on such load cells, which are hardly accessible and therefore can only be cleaned with difficulty, where then bacteria, viruses and fungi easily deposit and take hold. Therefore, in the use of load cells in many areas of the chemical, pharmaceutical, cosmetic, and foodstuff industries, it is necessary that these are easy to clean and if possible have no surface areas on which dirt, foodstuff residues, chemicals, bacteria, viruses and fungi can become deposited and take hold, penetrate, or build-up.

A hermetically sealed measured value pick-up or transducer, which represents a load cell, is known from the DE 10 2004 047 508 B3, which is embodied as a horizontally installable bending beam. This bending beam consists of a force introduction or input part and a force output part, between which a force measuring element is arranged. In that regard, the force measuring element consists of a vertical bending spring, which was produced by two oppositely directed horizontal transverse bored holes in the middle bending beam part, and on which strain gages are applied on both sides as shear force pick-ups or transducers, which produce a proportional electrical signal in connection with a weight loading. For the hermetic sealing in that regard, pot-shaped metallic sheet metal parts are welded into the bored holes, and hermetically tightly enclose the sensitive electrical measuring elements. Thereby it is primarily prevented, that moisture and other corrosive dirt particles come into contact with the sensitive measuring elements, so that a load cell having a long life is produced. While this load cell is rod shaped and equipped with largely flat exterior surfaces, whereby however foodstuff or liquid residues can deposit especially on the horizontally extending cover surface, and these residues in connection with moisture tend to cause an increase or multiplication of bacteria or viruses. Moreover, dirt and foodstuff components could also adhere in the pot-shaped depressions, which may only be cleaned with difficulty, and in which fungi and bacteria could form. Therefore, even such a hermetically sealed load cell is often not usable in aseptic areas or fields according to the applicable hygiene regulations.

From the German patent publication DE 37 15 572 A1, a load cell for an electromechanical platform scale is known, which essentially consists of a cylindrical round rod, from which at least flowable foodstuffs and liquids would run-off by means of gravity. In that regard, one side of the bending rod is secured by means of two screws on the scale housing, while the opposite end as a flattened round rod is connected with the weighing platform, whereby the weight force is introducible transversely to the longitudinal direction. However, in this load cell, the strain gages may be applied on the surface of the bending rod for producing the electrical measurement signals, so that such a load cell cannot be cleaned with watery or aqueous cleaning agents, and therefore is not always usable in the foodstuff industry or in aseptic areas or fields.

A further load cell with cylinder-shaped horizontally arranged housing is known from the German patent publication DE 28 18 140 A1, which is to be completely protected with respect to foreign influences. In that regard, a horizontal round rod is arranged in the housing body, and is secured at its one end region in a free carrying pipe. On the outer circumferential surface of the free carrying pipe, strain gages are applied, which pick-up and measure a strain on the outer circumferential surface of the pipe in connection with a vertical force introduction into the end point of the rod. In that regard, the free carrying pipe is hermetically tightly enclosed by a cylinder-shaped enclosure sleeve as a housing part. However, the force introduction is carried out via a threaded bolt in a chamber that is open at least toward the bottom, and in which a force introduction eye grasps around the rod, which is movably guided in this open chamber. Because this chamber is not hermetically enclosed, dirt and liquid residues can penetrate therein and are hardly removable, so that this load cell is not usable in contact with foodstuffs.

An installation or mounting set for a load cell is previously known from the European patent publication EP 1 698 871 A1, and is especially usable in the area or field of the chemical and pharmaceutical, the foodstuff and cosmetic industry. In that regard, this installation or mounting set includes a vertically arranged load cell, which is arranged between two parallel horizontally arranged mounting plates. Apparently, two round compression parts are provided as force introduction or input and force output elements, between which the load cell is arranged. In that regard, the load cell is arranged enclosed in a round conically extending housing, which engages into the compression parts or encompasses these so that this installation or mounting set is well cleanable and apparently has few gaps and hollow spaces in which bacteria, viruses and fungi could form. However, hereby the compression parts as force introduction or force output elements are only loosely connected with the load cell, so that such a load cell can only be installed vertically and also cannot be connected securely with the scale, so that another installation or mounting set will always additionally be necessary.

SUMMARY OF THE INVENTION

In view of the above, it is an object of an embodiment of the invention to further develop a hermetically sealed load cell so that it is easily cleanable and includes no gaps, depressions and horizontal surface parts in and on which residues, dirt, bacteria, viruses or fungi can be deposited or multiplied, so that it is also usable in an aseptic environment, especially in equipment for foodstuff processing. Another object of the invention is to provide an integrated overload protection for such a hermetically sealed load cell, without detracting from the hermetic seal or the ability to aseptically clean the load cell. One or more of the embodiments of the invention further aim to avoid or overcome the disadvantages of the prior art, and to achieve additional advantages, as apparent from the present specification. The attainment of these objects is, however, not a required limitation of claimed embodiments of the invention.

The above objects can be achieved by a load cell arrangement according to an embodiment of the invention as set forth herein. For example, a load cell, preferably for an aseptic platform scale, is embodied rod-shaped and comprises a force introduction element and a force output element and a force measuring element arranged axially therebetween. The force measuring element comprises a bending beam, of which internally located measuring spring parts have strain gages applied thereon, and are hermetically tightly enclosed by an enclosure. The force to be measured is introducible perpendicularly to the longitudinal axis. The force introduction element, the force measuring element and the force output element are preferably embodied substantially rotationally symmetrical and rounded-off along a longitudinal axis. An overload protection provided within the bending beam includes an axial overload beam with a contact stop head in a recess of the middle part of the bending beam, which contact stop head reaches into an expanded recess part of one end of the bending beam, whereby the expanded recess part is provided with at least one bored hole, wherein one part of the cross sectional area of the bored hole extends in the end of the bending beam and another part of the cross sectional area extends in the contact stop head, and into which a fitting pin is fixed, which leaves a defined gap relative to the end of the bending beam.

In an embodiment, the enclosure comprises a flexurally stiff pipe sleeve with the bending beam arranged therein, whereby the ends of the bending beam are connected with ring elements which are oriented perpendicularly to the longitudinal axis, and which are welded with the pipe sleeve at their radial edge area, whereby the ring elements include concentrically encircling flexurally soft membranes, which connect the pipe sleeve with the bending beam and the force introduction element and the force output element in a force shunt free manner.

Due to the integrated overload protection, the above mentioned embodiment of the invention has the advantage, that hereby neither the structural volume of the load cell is increased, nor unencapsulated parts of the overload device protrude to the outside in a manner that is sensitive to soiling. In that regard, the overload protection additionally has the advantage that it substantially can be produced from the monolithic force measuring element by a milling and boring process of the bending beam base body that is to be produced, in a simple manner preferably with a program controlled machine tool, so that merely the freely obtainable fitting pins are still insertable. This embodiment of the invention simultaneously has the advantage that the production of the overload protection also requires no additional installation time and no manual adjustment work. Because such fitting pins are obtainable as cost-economical mass produced parts in high accuracy classes, advantageously the very small gap widths can be produced very accurately with simple machining processes, so that the inventive overload protection protects the strain gage very reliably against arising overloads.

Through the fitting pins arranged transversely to the longitudinal direction, it is advantageously simultaneously achieved that the overload protection is uniformly effective over the entire width of the force measuring element, so that especially a turning or rotation of the bending beam about the longitudinal axis in connection with an off-center force introduction is prevented.

In a particular embodiment of the invention it is provided to use two fitting pins for limiting or bounding the movable bending beam part in both vertical directions, whereby advantageously an overload protection in the tension and compression direction is simultaneously achievable, which protects the strain gages against overloading in both possible motion directions of the force element.

The above objects can further be achieved by a load cell arrangement according to another embodiment of the invention as set forth herein, comprising a longitudinal body, strain gages, a hermetically sealed enclosure, an O-ring and at least two centering pins. The longitudinal body extends along a longitudinal axis and comprises a force input element, a force output element, and a bending beam. The bending beam is arranged axially between and connected to the force input element and the force output element. The bending beam includes strainable measuring parts, and is arranged and configured so that a force to be measured, which is applied perpendicularly to the longitudinal axis onto the force input element, will cause bending of the bending beam and therewith a measureable strain in the strainable measuring parts. The strain gages are applied on the strainable measuring parts of the bending beam so as to measure the measureable strain. The hermetically sealed enclosure in an embodiment comprises a pipe sleeve arranged coaxially along the longitudinal axis, and is arranged outwardly around and encloses the strainable measuring parts and the strain gages on the strainable measuring parts. An end face of the force input element or of the force output element is to be connected to a weighing scale part in a hermetically-sealed and force-transmitting manner with limited play therebetween. For this, the end face has at least one threaded hole and at least two centering holes therein with the holes respectively extending axially parallel to the longitudinal axis, the end face has a first circular groove therein concentrically around the longitudinal axis and outwardly around the holes, the first O-ring is received in the first circular groove, and the centering pins are received in the centering holes. Furthermore, the end face, the holes, the centering pins and the first O-ring are configured and arranged so that the end face is to be connected to the weighing scale part by at least one threaded bolt engaged into the at least one threaded hole, whereby the first O-ring provides a seal between the end face and the weighing scale part, and the centering pins provide a centered alignment with limited play between the end face and the weighing scale part.

The above objects can still further be achieved by a load cell according to another embodiment of the invention as set forth herein. Such a load cell is embodied rod-shaped and comprises a force measuring element arranged axially between a force introduction element and a force output element. The force measuring element comprises a bending beam including measuring spring parts that have strain gages applied thereon and that are hermetically tightly enclosed by a hermetically sealed enclosure. A force to be measured is to be introduced perpendicularly to a longitudinal axis of the load cell. The hermetically sealed enclosure in an embodiment is a metal enclosure that comprises a pipe sleeve and two ring elements. The pipe sleeve is arranged coaxially outwardly around the bending beam which is arranged inside and enclosed within the pipe sleeve. The ring elements extend along planes perpendicular to the longitudinal axis and connect and hermetically seal the pipe sleeve to the bending beam and the force introduction element and the force output element. At least one threaded bored hole is provided extending axially parallel to the longitudinal axis respectively in at least one end face of at least one of the force introduction element and the force output element for securing the load cell to a weighing platform or a scale frame as a securing part. Unthreaded centering holes are provided extending axially parallel to the longitudinal axis at respective defined locations of the end face. The centering holes are surrounded by at least one groove coaxially around the longitudinal axis, into which at least one O-ring is laid for sealing a securing gap between the end face and the securing part.

An embodiment of the invention has the advantage that due to the horizontal installation position it also comprises only vertically declining surface parts, so that all foodstuffs, cosmetics or pharmaceutical components coming in contact therewith can only be deposited with difficulty, whereby a formation of fungi, viruses or bacteria is largely prevented. Due to the welded encapsulation of the load cell, this is also well cleanable and disinfectable with watery or aqueous solutions, so that such load cells advantageously can also be used in the aseptic area or field.

In a further particular embodiment of the invention it is provided to seal it by simple O-ring seals relative to the mounting or securing parts thereof and to center it by centering pins, which has the advantage that neither germs nor the smallest dirt particles can penetrate even on the securing or mounting surfaces, without this leading to an unstable bearing support or twisting or rotation on the connection surfaces. In that regard, especially an O-ring seal arranged on the outer circumference of the force introduction or force output element has the advantage, that even during the cleaning no germ-forming liquid can penetrate by capillary action into the gap between the securing surfaces.

Simultaneously the centering has the advantage that the floating support of the connecting surfaces is exactly fixable with mass produced securing screws and at least two simple centering pins, without the force direction deviating from the measuring direction. With such a sealing and centering, advantageously both the force introduction as well as the force uptake element can be sealed relative to its securing or mounting parts.

In a further particular embodiment of the invention it is provided to embody the force measuring element as a double bending beam with which very high measuring accuracies are advantageously achievable. Therefore, also scales that must be calibrated are advantageously producible with such load cells.

In a different particular embodiment, the entire load cell consists of a high strength, high grade stainless steel so that such a load cell can be used even with high humidity and aggressive environmental influences, and thus represents a very long-lived embodiment and which also is not attacked by most chemicals or pharmaceutical raw materials. Thereby it is especially advantageous, to taper the closed ring elements circumferentially in such a manner so that they form membranes, whereby advantageously a measuring element arises that is encapsulated all around, and that comprises outwardly flat or smooth rounded surfaces that are well cleanable, without exerting a significant force shunt effect on the actual measuring element. Whereby simultaneously a high measuring accuracy is also ensured.

Through the special nearly cylindrical embodiment of the force introduction and force output elements, advantageously an embodiment is achieved that can be used in flat platform scales. Thereby the force introduction and force output elements are equipped with parallel vertical centered and sealed securing surfaces, so that they advantageously allow a well-drained tightly-sealed vertical securing.

In a further special embodiment it is additionally still provided, to provide the load cell with a protective layer, which comprises a surface with difficult adhesion, so that friable or flowable or liquid materials that come in contact therewith will flow off without leaving behind residues, and so that a germ formation especially of illness germs is prevented even without any mentionable cleaning measures.

BRIEF DESCRIPTION OF THE DRAWINGS

The invention will be explained in further detail in connection with an example embodiment, which is illustrated in the drawing. It is shown by:

FIG. 1: a hermetically sealed load cell according to the abovementioned related application with vertical securing surfaces;

FIG. 2: a hermetically sealed load cell with internally located overload protection;

DETAILED DESCRIPTION OF EXAMPLE EMBODIMENTS OF THE INVENTION

Figure 3:
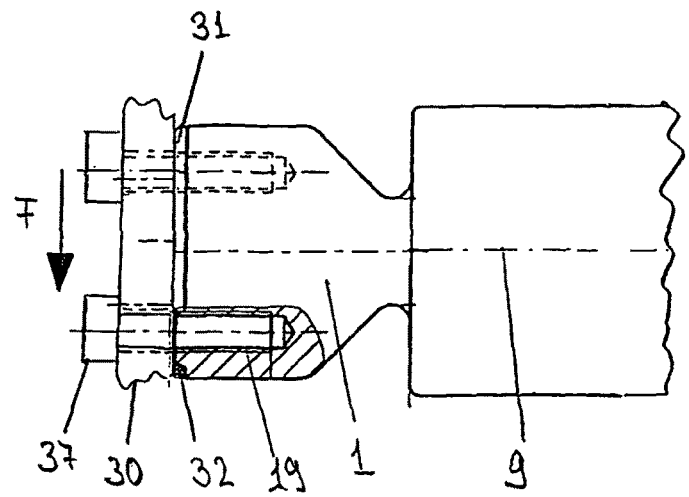
FIG. 3: a side view of a force introduction element of the load cell with centered and sealed securing part of a weighing platform.

In FIG. 1 of the drawing, a hermetically sealed load cell according to the main application is shown, which is embodied rotationally symmetrically, whereby a double bending beam 3 is arranged in the longitudinal direction between the force introduction element 1 and force output element 2, which double bending beam 3 is enclosed by two ring elements 5, 6 provided at its end regions, and a pipe sleeve 4 that is welded therewith, whereby the ring elements 5, 6 include concentrically encircling thin locations as membranes 7, 8, which connect the pipe sleeve 4 in a flexurally or bendably soft manner with the force introduction element 1 and the force output element 2 and the double bending beam 3.

The load cell basically consists of a central longitudinal body, from which the force introduction element 1, the force output element 2, the double bending beam 3 and the two ring elements 5, 6 are machined. Thereby, the longitudinal body preferably consists of a high-value, high-grade flexurally elastic stainless steel, over which the pipe sleeve 4 is tipped in the finished condition and is welded in an airtight manner with the two ring elements 5, 6. For a load cell with a 10 kg rated load, the central longitudinal body is preferably 120 mm long and approximately 40 mm in diameter. The double bending beam 3 is arranged between the force introduction element 1 and the force output element 2, and includes a parallelepiped block shaped middle part 14. A horizontal cut-out recess 11 is provided in the middle part 14 symmetrically to a longitudinal axis 9 and a transverse axis 10, whereby the recess 11 comprises a clover leaf type cross-section due to four horizontal bored holes. Thereby, webs 12 embodied as bending springs or forming so-called measuring spring parts or strainable measuring parts arise on the two parallel horizontal cover surfaces of the middle part 14, and preferably eight strain gages are applied on webs 12, whereby under a vertical force loading, i.e. input weight force F applied perpendicularly to the longitudinal axis 9, the strain gages produce an electrical signal that is proportional to the introduced weight force F.

Two tapering round connecting pieces 13, 16 are applied or mounted on the two ends of the middle part 14, which pieces connect the double bending beam 3 on one side with the force introduction element 1 and on the opposite side with the force output element 2. Approximately in the middle of each axial connecting piece 13, 16, respectively one ring element 5, 6 is applied or mounted transversely to the longitudinal axis 9, wherein the outer diameter of the ring element corresponds to the inner diameter of the pipe sleeve 4 and is larger than the diameter of the force introduction element 1 and of the force output element 2, and preferably amounts to approximately 39 mm. The two ring elements 5, 6 are concentrically tapered in a concave manner on the annular ring surface facing toward the double bending beam 3, and thereby form a concentrically encircling first membrane 7 and second membrane 8, of which the thickness preferably amounts to 0.3 mm.

The round connecting pieces 13 and 16 preferably comprise a diameter of 16 mm. The force introduction element 1 and the force output element 2 are respectively arranged in the axial direction laterally next to and connected to the first connecting piece 16 and the second connecting piece 13 respectively. From there, the force introduction element 1 and the force output element 2 both expand outwardly conically to preferably a 38 mm diameter through an encircling circumferential groove 21, in order to then transition into a cylindrical form of approximately 16 mm length, which then ends in a flat end face 17 as a vertical securing surface. Thereby, both the force introduction element 1 as well as the force output element 2 are identically embodied in their external shape, and are both arranged symmetrically to the longitudinal axis 9 and transverse axis 10. In the force output element 2, in the longitudinal direction, a central longitudinal bored hole 22 is still provided, which extends at least to the recess 11, and in which the connection lines for the strain gages are guided. Therefore, a connecting cable 18 is still further secured in a sealed manner in the force output element 2, in which connecting cable the connecting lines are guided to the outside in a sealed manner.

For securing the load cells on a scale frame, two horizontal threaded bored holes 19 are still further applied on the end face 17 of the force output element 2, and for the securing of a weighing platform two same-type threaded bored holes 19 are provided similarly on the end face of the force introduction element 1. Thereby the two parallel end faces 17 represent vertical securing surfaces, so that such load cells are usable not only for platform scales but also for any other weighing devices in which the weight force F is introduced perpendicularly to the longitudinal axis 9 into the end face 17 of the load cell.

After the application and wire-connection of the strain gages, the double bending beam is hermetically enclosed by means of a pipe sleeve 4 that is slid over it, by welding the pipe sleeve with the ring elements 5, 6. In that regard, the pipe sleeve 4 also preferably consists of a high-strength high-grade stainless steel. The length of the pipe sleeve 4 corresponds to the spacing distance between the two ring elements 5 and 6, with the radial outer edges of which the pipe sleeve is welded in an airtight manner. In that regard, the pipe sleeve 4 is embodied flexurally stiff, whereby the outer circumferential surface thereof comprises only a small prescribed roughness, which is preferably producible by an electro-polishing, so that this has a surface that allows good running-off drainage and is easy to clean.

In FIG. 2 of the drawing, a part of a hermetically sealed load cell according to FIG. 1 of the drawing is illustrated with a sectional illustration of an internally located overload protection 15, which comprises an overload beam 20 with a contact stop head 23 within the double bending beam 3, which contact stop head reaches into an expanded or widened recess 24 at the end 28 of the bending beam 3 toward the force introduction element 1, whereby two horizontal bored holes 25 are also introduced into the contact stop head 23 toward the expanded recess 24, into which horizontal bored holes respectively a fitting pin 26 is fixed in such a manner so that its outer circumferential surface leaves a defined gap 27 remaining for contacting against the movable part of the bending beam 3.

For preventing an overloading and damaging of the sensitive strain gages, often in load cells an overload protection is provided, which limits the movable part of the load cell at least in the measuring direction. For that purpose, usually stationary limiting elements are provided in the outer movement range of the bending beam 3, whereby the limiting elements often are still embodied to be exactly adjustable due to the small deflection distances.

Because an externally round closed load cell is involved here, on which no dirt particles and germs shall adhere, an external overload protection was disadvantageous. Therefore, the overload protection 15 was integrated in the recess 11 of the double bending beam 3, so that the overload protection 15 is arranged within the hermetically sealed area. For that, an axial horizontal overload beam 20 is arranged in the recess 11 of the double bending beam 3, and the overload beam is connected with the stationary rigid end 29 of the double bending beam 3 on its force output side. On the other movable end 28 of the double bending beam 3, additionally a widened or expanded recess 24 is provided, which is preferably introduced into the monolithic middle part 14 of the bending beam 3 by six horizontal transverse bored holes.

The overload beam 20 protrudes with its contact stop head 23 into this expanded recess 24. In that regard, two parallel horizontal bored holes 25 are introduced one over another in the contact stop head 23 and in the movable end 28 of the bending beam 3, whereby the cross section of the horizontal bored holes is arranged with more than half (>180°) in the contact stop head 23 and with a remainder (<180°) in the movable end 28 of the bending beam 3. Respectively one fitting pin 26 is slid or pressed horizontally at the top and at the bottom into the two cross section areas of the bored holes 25 of the contact stop head 23 for the purpose of fixing, whereby the fitting pins are vertically fixed by their cross section of more than one half in the bore hole parts of the contact stop head 23. In that regard, each bored hole part 25 is produced in a manner enlarged by the limiting path distance toward the movable part of the bending beam 3, so that a defined gap 27 is provided there, which serves for limiting the deflection of the bending beam 3 relative to the rigid overload beam 20. Because such fitting pins 26 are obtainable as mass produced parts with high accuracies, such an overload protection 15 is not only very accurately producible, but also still cost-economical. Because vertical movements of only 0.05 to 0.15 mm are provided for such double bending beams 3, prescribed gap widths of 0.1 to 0.5 mm are usually sufficient for the limiting.

Such an overload protection 15 is also usable for simple one-sided bending beams. Basically the contact stop head 23 could also reach into the rigid force output part 2 of the bending beam 3, if the overload beam 20 was secured on the movable part of the bending beam 28. The double bending beam equipped with two fitting pins 26 arranged parallel transversely to the longitudinal direction is designed for an overload in measuring direction (compression) as well as in the opposite direction (tension). If only the overload in the measuring direction is to be limited, then an embodiment with only one upper fitting pin 26 is also sufficient.

Figure 4:
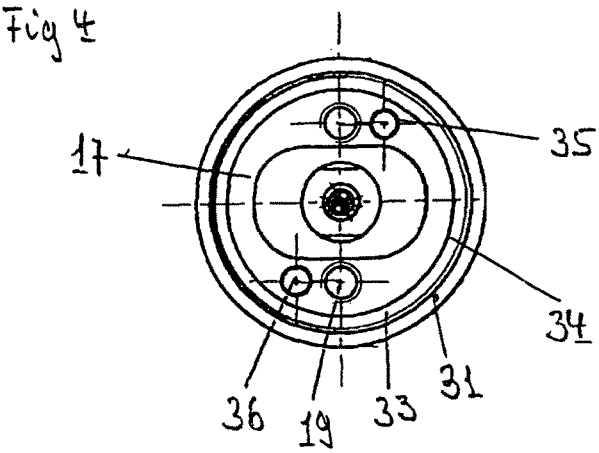
FIG. 4: a front view of a centerable and sealable force introduction element.
Figure 5:
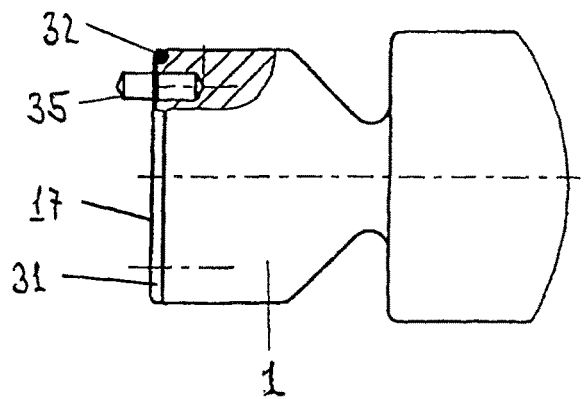
FIG. 5: a side view of the force introduction element with sectional view of a centering pin.

For improving the sealing relative to adhering dirt and germ particles and simultaneously for improving the measuring accuracy, a centered and sealed force introduction element 1 is illustrated in FIGS. 3 to 5 of the drawing, and preferably a securing or mounting part 30 of a weighing platform is arranged on the force introduction element 1 for force introduction. Because such a hermetically sealed load cell is preferably used for an aseptic application, it is often sensible that no dust-type soiling and germ particles can get between the securing gaps. However, due to such a sealing, the measuring accuracy shall not become worse.

For this purpose, for better sealing between the securing or mounting part 30 and the end face 17 of the force introduction element 1, a coaxial outer groove 31 is milled into the outer rim of the end face 17. An O-ring 32 is laid into this groove for the outer sealing between the outer surface of the securing part 30 and the rim area of the end face 17, by which a hermetic seal is achieved, so that neither germs nor dirt particles can get between these contact surfaces.

For carrying out the sealing, the securing or mounting part 30 is tightly screwed together with the force introduction element 1 by means of one or more securing screws 37, so that the outer surfaces of the securing part 30 lie tightly on the outer O-ring 32. Because basically a floating support arises through the sealing with the elastic O-ring 32 between the end face 17 and the outer surface of the securing element 30, which can lead to a directional or orientation error of the force introduction and force measuring direction due to an unavoidable play of the securing screws 37 and a possible twisting or rotation or a different or varying loading on the weighing platform, additionally at least two centering bored holes 36 are provided within the end face 17 surrounded by the outer O-ring 32. As schematically indicated in FIGS. 4 and 5, the centering holes 36 for receiving centering pins 35 may be unthreaded bored holes, in comparison to the holes 19 that are threaded in order to be engaged by the threaded securing bolts or screws 37. Two highly exact centering pins 35 are fitted into these centering bored holes 36, so that the force introduction direction F always extends in the measuring direction. In that regard, the centering bored holes 36 are preferably provided on the circumferential circle of the securing screws 37 and at an angular spacing therefrom of preferably 30°. With higher weight force loading more than two centering pins 35 can also be used, which comprise at most a play of 0.01 to 0.03 mm in the centering bored holes 36 of the force introduction element 1 and of the securing part 30.

For further improving the sealing between the securing part 30 and the end face 17, additionally still a second coaxial inner groove 33 is introduced into the force introduction element, which similarly surrounds the securing screws 37 and the centering pins 35, and which achieves a wider seal surface in connection with a screw connection or securing. Such a sealing and centering is preferably also provided on the force output element 2, so that this is also hermetically sealed relative to its rigid securing parts. Insofar as the load cell is only loaded with relatively small forces below the nominal rated load, it can also be used with only the centered and sealed force introduction and/or force uptake element without the overload protection 15.

Through the illustrated covering of the flat securing surfaces 17 by securing elements of the weighing device, all embodiments have only downwardly sloping rounded surfaces on which friable or flowable or liquid goods can run off downwardly. Because the entire surfaces of the load cell preferably are embodied with only a small or low roughness, and comprise no undercut and no tight gaps, friable or flowable goods or liquids can hardly adhere thereon. In a further embodiment it is still further provided to provide the load cell additionally with a difficult adhering surface coating, such as, e.g. polytetrafluoroethylene (Teflon), whereby an adhesion is additionally prevented and the cleaning possibility is improved. Therefore such load cells are preferably usable in the foodstuff supply, whereby any germ formation especially of the illness germs or their multiplication must be prevented.

Due to the production of the load cells of high-grade stainless steel and the encapsulation of the double bending beam by the welding of the pipe sleeve 4 with the high-grade stainless steel ring elements 5, 6, a penetration of germ-forming substances is absolutely prevented, so that such load cells are also usable in aseptic areas or fields. Thereby, especially through the two membranes 7, 8 on the annular ring surfaces, a decoupling of the introduced weight force F is achieved, so that nearly no force shunt coupling to the flexurally stiff pipe sleeve 4 arises, so that a high measurement accuracy is achievable. Therefore, also highly exact, calibrateable scales can also be produced with such load cells.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. Load cell, which is embodied rod-shaped and consists of a force introduction element and a force output element and a force measuring element arranged axially therebetween, whereby the force measuring element comprises a bending beam, of which internally located measuring spring parts with strain gages applied thereon are hermetically tightly enclosed by welded metal parts, and a force to be measured is introducible perpendicularly to a longitudinal axis, whereby the force measuring element consists of a pipe sleeve with the bending beam arranged therein, whereby ends of the bending beam are connected with ring elements which are oriented perpendicularly to the longitudinal axis, whereby the ring elements are welded to the pipe sleeve respectively at radial edge areas of the ring elements, whereby the ring elements include concentrically encircling membranes, which connect the pipe sleeve with the bending beam and the force introduction element and the force output element, whereby relative to each other the pipe sleeve is flexurally stiff and the membranes are flexurally soft, characterized in that an overload protection is provided within the bending beam, which overload protection includes an axial overload beam with a contact stop head in a recess of a middle part, which contact stop head reaches into an expanded recess part of one end of the bending beam, whereby the expanded recess part is provided at least with one bored hole, wherein one part of the cross sectional area of the bored hole extends in the one end of the bending beam and another part of the cross sectional area extends in the contact stop head, and into which a fitting pin is fixed, which leaves a defined gap to the one end of the bending beam.

2. Load cell according to claim 1, characterized in that the bending beam is embodied as a double bending beam that includes a parallelepiped block shaped middle part in which a cut-out recess is provided, which forms two horizontal parallel webs, on which the strain gages are applied.

3. Load cell according to claim 2, characterized in that the overload beam is arranged horizontally between the two webs and in that two bored holes for respectively one fitting pin are introduced horizontally one above another in the expanded recess part between the contact stop head and the end of the movable bending beam, whereby one fitting pin limits the movable part of the bending beam upwardly and the other fitting pin limits the bending beam downwardly.

4. Load cell according to claim 1, characterized in that the force introduction element arranged along the longitudinal axis and the adjoining first ring element arranged about a first connecting piece, as well as the bending beam with the overload beam connected therewith, and, adjoining thereon, the second connecting piece with the second ring element arranged thereon, and the force output element connected therewith, are embodied as one piece.

5. Load cell according to claim 1, characterized in that the ring elements are embodied disc-shaped about the centrally arranged connecting pieces and are concentrically tapered on at least one concentrically encircling annular ring surface part in such a manner so that they respectively form a flexurally soft membrane.

6. Load cell according to claim 5, characterized in that the annular ring surface sides that are oriented facing toward the bending beam comprise a concave encircling depression and that the annular ring surface sides oriented facing toward the force introduction element and the force output element are embodied planar.

7. Load cell according to claim 1, characterized in that the outer surface of the load cell except for the end face comprises only rounded-off surface parts, which have a smooth surface of low roughness.

8. Load cell according to claim 1, for an aseptic platform scale.

9. Load cell according to claim 1, wherein the force introduction element, the force measuring element and the force output element are each substantially rotationally symmetrical and rounded-off along the longitudinal axis.

10. Load cell according to claim 1, wherein the membranes connect the pipe sleeve with the bending beam and the force introduction element and the force output element so that nearly no force shunt coupling to the pipe sleeve arises.

11. A load cell arrangement comprising a longitudinal body, at least one strain gage, and at least one overload protection pin, wherein:
said longitudinal body extends along a longitudinal axis and comprises a force input element, a force output element, and a bending beam,
said bending beam is arranged axially between said force input element and said force output element,
said bending beam includes a connecting piece connected to said force input element and another connecting piece connected to said force output element, and a middle part that extends between and interconnects said connecting pieces,
said middle part includes at least one strainable web, a cavity in said middle part bounded by said at least one strainable web, and an overload protection beam that has a base end of said overload protection beam connected to a first side of said middle part adjoining a first one of said connecting pieces, and a free end of said overload protection beam extending in said cavity toward a second side of said middle part adjoining a second one of said connecting pieces,
said free end has at least one pin-receiving groove extending transversely therethrough,
said at least one pin-receiving groove respectively has a cross-sectional shape of a first portion of a virtual circle in said free end of said overload protection beam, and a remainder of said virtual circle other than said first portion forms an open side of said respective pin-receiving groove that is open to said cavity and faces a respective stop surface of said second side of said middle part of said bending beam in said cavity,
said bending beam is arranged so that a force to be measured, which is applied onto said force input element, will cause bending of the bending beam and therewith a measurable strain in said at least one strainable web and a relative motion between said free end of said overload protection beam and said second side of said middle part of said bending beam,
said at least one strain gage is applied on said at least one strainable web of said bending beam so as to measure said measurable strain, and
said at least one overload protection pin is arranged respectively in said at least one pin-receiving groove so as to respectively form a defined gap between said overload protection pin and said stop surface when no force is applied onto said force input element.

12. The load cell arrangement according to claim 11, wherein said at least one strainable web comprises two strainable webs that extend parallel to one another and interconnect said connecting pieces, and that bound said cavity between said two strainable webs, and wherein said at least one strain gage comprises strain gages respectively applied on said two strainable webs.

13. The load cell arrangement according to claim 11, wherein said overload protection beam extends longitudinally parallel to and centered between said two strainable webs, said at least one pin-receiving groove includes two said pin-receiving grooves on opposite sides of said free end of said overload protection beam facing respectively toward said two strainable webs, and said at least one overload protection pin includes two said overload protection pins arranged respectively in said two pin-receiving grooves so as to respectively form two said defined gaps respectively between said two overload protection pins and two said stop surfaces of said second side of said middle part of said bending beam in said cavity, so that a first one of said overload protection pins abuttingly cooperates with a first one of said stop surfaces to limit said relative motion between said free end of said overload protection beam and said second side of said middle part of said bending beam in a first motion direction and a second one of said overload protection pins abuttingly cooperates with a second one of said stop surfaces to limit said relative motion between said free end of said overload protection beam and said second side of said middle part of said bending beam in a second motion direction opposite said first motion direction.

14. The load cell arrangement according to claim 11, wherein said overload protection pin abuttingly cooperates with said stop surface to limit said relative motion.

15. The load cell arrangement according to claim 11, wherein said bending beam including said connecting pieces, said at least one strainable web and said overload protection beam is a monolithic one-piece component.

16. The load cell arrangement according to claim 11, wherein said overload protection pin and said stop surface extend parallel to one another transversely to said longitudinal axis so that said defined gap has a uniform gap size through an entire width of said bending beam.

17. The load cell arrangement according to claim 11, further comprising a hermetically sealed enclosure that encloses therein said at least one strainable web, said cavity, said overload protection beam, said at least one strain gage, and said at least one overload protection pin.

18. The load cell arrangement according to claim 17, wherein said hermetically sealed enclosure comprises a relatively stiff pipe sleeve arranged coaxially along said longitudinal axis and outwardly around said bending beam, and two ring elements that each respectively comprise a relatively flexible membrane, wherein said ring elements are connected to and protrude radially outwardly from said connecting pieces, and said ring elements are connected to and support said pipe sleeve relative to and spaced radially away from said longitudinal body.

19. The load cell arrangement according to claim 11, wherein said first portion of said virtual circle forming said cross-sectional shape of said pin-receiving groove is more than 180° of said virtual circle, and said overload protection pin is held in said pin-receiving groove by said pin-receiving groove engaging more than 180° around a perimeter of said overload protection pin.

20. The load cell arrangement according to claim 11, wherein said defined gap has a gap width in a range from 0.1 mm to 0.5 mm.

21. A load cell comprising a monolithic body, at least one strain gage, and an overload protection pin, wherein:
   said monolithic body comprises a first end block, a second end block, two strainable webs that each connect said first end block with said second end block, a cavity within said monolithic body bounded between said two strainable webs and between said first and second end blocks, and an overload protection beam that has a base end thereof fixed to said first end block and a free end thereof extending in a longitudinal direction toward said second end block in said cavity between said two strainable webs;
   said at least one strain gage is arranged on at least one of said strainable webs;
   said free end of said overload protection beam has therein a groove extending transversely to said longitudinal direction;
   said monolithic body includes a stop surface facing inwardly into and bounding said cavity at a location adjacent to said groove;
   said groove has a cross-sectional shape of a portion of a circle greater than 180°;
   said overload protection pin has a circular cross-sectional shape, is arranged and held with more than 180° of a perimeter of said overload protection pin in said groove, and protrudes with less than 180° of said perimeter out of an open side of said groove; and
   said stop surface, said overload protection pin, said groove and said overload protection beam are dimensioned and configured so that a defined gap exists between said overload protection pin and said stop surface in an unloaded condition of said load cell and so that said overload protection pin contacts said stop surface in an overloaded condition of said load cell.

* * * * *